Patented Sept. 28, 1954

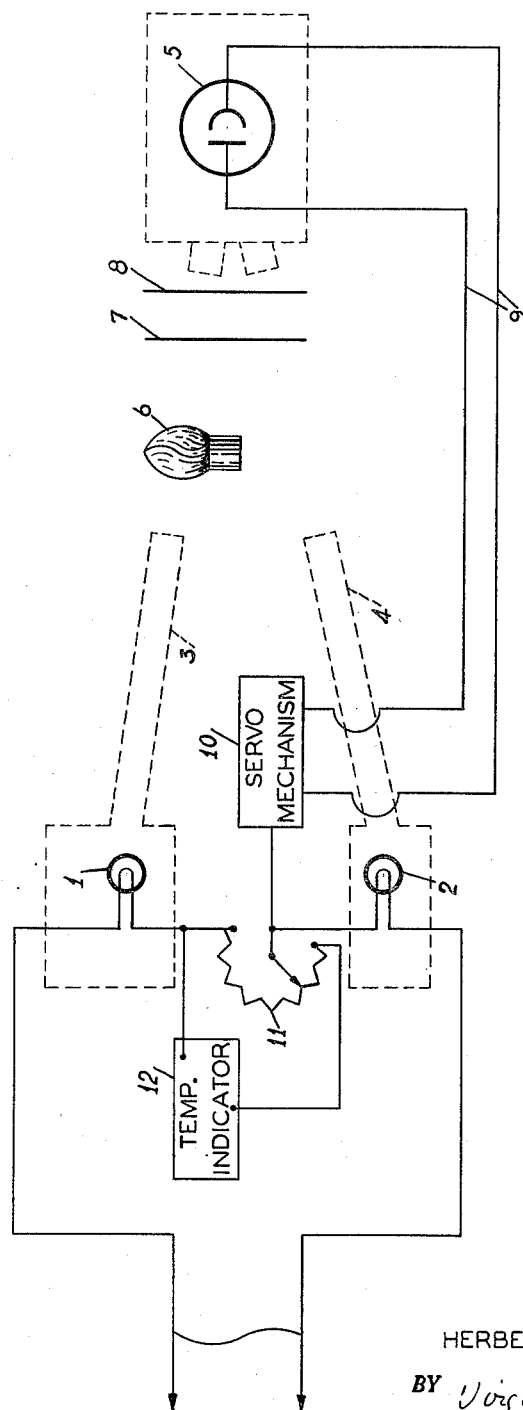

2,690,511

UNITED STATES PATENT OFFICE 2,690,511

COMPARATIVE EMISSION PYROMETER

Herbert A. Elion, Franklin Square, N. Y., assignor to The M. W. Kellogg Company, Jersey City, N. J., a corporation of Delaware Application November 9, 1949, Serial No. 126,391

2 Claims. (Cl. 250—205)

The present invention relates to an apparatus for measuring high flame temperatures and specifically refers to a system of continuous measurement of temperatures such as exist in rocket exhaust gases.

Among the objects of the present invention is the construction of an improved means for the measurement of high flame temperatures, which is free from the objections of the presently used methods, is uncomplicated and inexpensive but has a rugged construction.

Another object is to devise a high flame temperature indicating apparatus which is capable of automatic operation and can be self-recording.

Still further objects of the present invention include the provision of an apparatus which permits temperature measurements not possible by other available means, can be used to measure the temperature of luminous and non-luminous flames and incorporates a large factor of safety for the operators.

Various other objects and advantages of the invention will be apparent from the particular description following and from an inspection of the accompanying diagram in which:

The figure is a schematic diagram of an automatic flame temperature recording pyrometer embodying the present invention.

This invention is of general application and may be used wherever automatic operation and self-recording are required in the measurement of high flame temperatures. As specifically disclosed herein it is particularly adapted for the measurement of the temperatures of rocket exhaust gases.

Temperatures of the order of 2000°–3000° centigrade are attained in the exhaust gases of rockets. Methods of measurement of such temperatures involve the introduction of an instrument (e. g. thermocouple) or a salt (e. g. sodium) into the exhaust flame or are based upon gas radiation.

The thermocouple method suffers because of temperature range and distribution in the flame, the instrument being essentially a point temperature device and so of limited value in giving space variation of temperature. The method involving the introduction of a salt into the flame, such as the sodium D-line reversal method, suffers from the fact that it is dependent on the human eye, that it may be restricted to one preset temperature, that it is important to color only that portion of the flame the temperature of which it is desired to read, and that it is not possible to obtain continuous measurement in any simple practical manner, yet it remains the most widely used and generally preferred method. Methods based on gas radiation rely basically upon grey body emission from the flame or utilize color pyrometry; the accuracy of this method suffers greatly from the number of sensitive elements involved.

The fundamental feature of the present invention, called a comparative emission pyrometer, is based on the radiation characteristic that emissivity of any body is equal to its absorptivity, irrespective of the width of any wave length interval. In the use of this pyrometer, an energy receiver, such as a photocell, is used to compare independent beams of grey body radiations or emissions, viz, two beams of light from separate tungsten filament lamps, one passing through and the other circumventing the flame whose temperature is to be measured. Inasmuch as a "black body" is virtually unobtainable, a grey body, such as a tungsten filament lamp, is used, it having been found experimentally that its emissivity is the same for all wave lengths of the visible spectrum. By use of a rotating shutter, the two beams fall alternately upon the photocell.

Since the flame affects the radiant flux of the beam of emissions passing through it, absorbing or emitting more light than it emits or absorbs, the photocell makes an electrical evaluation of the comparison of the emissions received from the two lamps and in the process activates means, such as a servo-mechanism, to adjust the emissions, in order to eliminate any differences received by the photocell.

The radiant fluxes of the beams and so their brightness temperatures are varied by changing the voltages across the filaments of the lamps, until equal flux effects are produced on the photocell. The flame then emits as much light as it absorbs so that the true temperature of the flame is equal to the brightness temperature of the tungsten filament lamp whose beam passes through the flame. Some instrument, such as a voltmeter, placed in the lamp circuit can be used as an indicator of brightness temperature, when calibrated with an optical pyrometer, and hence the temperature of the flame can be obtained automatically.

A possible alternate construction utilizing only one source of radiation, whose emissions are split, would require an extensive mirror and lens system which is too fragile and inflexible for ordinary everyday rocket experimentation. It is also possible to detect radiant energy by using a photomultiplier tube and so limit the spectral region examined to the flame plus alkali salts. The thermopile, bolometer, radiometer of some other radiant detector might also be used with suitable selective filters.

Advantages over the sodium D-line reversal method include: (1) continuous and instantaneous temperature readings since time consuming adjustments are not required; (2) no necessity for visual measurement; (3) no requirement for the presence of personnel in the immediate vicinity of the rocket exhaust flame; and (4) no addition of salts is needed to measure luminous flame temperatures.

Referring to the drawing, a preferred embodiment of the present invention is disclosed, comprising an electrocal circuit which includes separate sources of radiation at 1 and 2, shown as tungsten filament lamps, for relatively low temperature use, but which may be carbon or tungsten arcs for high temperature use. The radiations or emissions from these lamps pass respectively through guide tube 3 and 4, which are aimed at photocell 5. The emissions from lamp 1 pass through flame 6 on the way to photocell 5. Between the photocell and the guide tubes, there is interposed a rotating shutter 7 so constructed that the emissions from the lamps 1 and 2, fall on the photocell alternately. There is also interposed between the photocell and the sources of radiation, a selective filter 8 for use when intermediate products of combustion color the flame blue or green (Swann bands). Leads 9 conduct the variations in electric current produced by photocell 5 to servo-mechanism 10 which is used to regulate the variable rheostat 11 in order to adjust simultaneously the brightness temperatures of lamps 1 and 2. The servo-mechanism 10 may be of any suitable conventional form and includes all of the elements necessary to adjust the rheostat 11 in both directions in accordance with the variations in the electric current transmitted through the leads 9. In the drawings, the box 10 labeled "servo-mechanism" is intended to house all of said necessary elements referred to just above. On opposite sides of rheostat 11 are connections to a temperature indicator 12, such as a voltmeter.

In the operation of this comparative emission pyrometer, the lamps are first calibrated with an optical pyrometer by varying the rheostat to get a series of brightness temperatures over the entire range of the lamps, and checking the voltmeter. The brightness temperature, being dependent on the wave length used in measuring the brightness with an optical pyrometer, must be calculated at the effective wave length of the photocell. By using independent sources of radiation, it is relatively simple to make specific adjustments to compensate for individual effects, such as aging. Also the separate sources can be adjusted easily to the size of flame under measurement. Before any flame temperature readings are taken, the instrument is balanced by regulation of the rheostat until the photocell ceases to react to the beams from the lamps.

When a flame is inserted in the beam of radiations from lamp 1, there is an unbalance of light received by photocell 5, which converts, the variations in the beams of radiations received, into a varying electric current, which activates the servo-mechanism to rebalance the system by varying the rheostat until the beam effects on photocell 5 yield a null effect. If properly calibrated, the voltmeter can be read as the brightness temperature of lamp 1 at the new rheostat reading, which temperature is the true temperature of the flame. To those conversant with the problems in this field, it is readily apparent that substitution of a suitable recording device for the temperature indicator would make the system automatic and self recording.

Since it will be apparent to those skilled in the art that certain changes may be made in the form of the apparatus disclosed, without departing from the spirit of the invention as set forth in the appended claims, it is intended that all matter contained herein shall be interpreted as illustrative and not limiting.

What is claimed is:

1. In a pyrometer for measuring temperatures of rocket exhaust gases, an electrical system including a pair of light emitting means, means for modifying said electrical circuit to simultaneously control the amount of light emitted by said pair of light emitting means, photo-electric means adapted to receive emissions from said light emitting means, the exhaust gases located between one of said light emitting means and said receiving means, said receiving means receiving emissions directly from the other of said light emitting means, said receiving means adapted to photo-electrically compare the variations in emissions received from said light emitting means and to transmit a variable electric current in accordance with said variations, and means responsive to said variable electric current adapted to control said electrical system modifying means to control the amount of light emitted by said light emitting means simultaneously.

2. In a pyrometer for high flame temperature measurement, an electrical system including a pair of series connected light emitting means, a variable rheostat in said system series connected between said light emitting means and adapted to simultaneously control the amount of light emitted by said pair of light emitting means, a photoelectric cell adapted to receive emissions from said light emitting means, the flame located between one of said light emitting means and said photo-electric cell, said photo-electric cell receiving emissions directly from the other of said light emitting means, a shutter between said photo-electric cell and said pair of light emitting means operable to interrupt emissions sequentially first from one, then from the other of said light emitting means to said photo-electric cell, said photo-electric cell adapted to transmit a variable electric current in accordance with the variations of emissions received by said photo-electric cell, and servo means responsive to said variable electric current operable to adjust said variable rheostat to control the amount of light emitted by said light emitting means simultaneously.

References Cited in the file of this patent

UNITED STATES PATENTS

| Number | Name | Date |
|---|---|---|
| 1,816,047 | Keuffel | July 28, 1931 |
| 2,096,323 | Gille | Oct. 19, 1937 |
| 2,145,591 | Fitzgerald | Jan. 31, 1939 |
| 2,219,775 | Harrison | Oct. 29, 1940 |
| 2,594,514 | Sweet | Apr. 29, 1952 |
| 2,601,182 | Tyler | June 17, 1952 |

FOREIGN PATENTS

| Number | Country | Date |
|---|---|---|
| 156,232 | Austria | May 25, 1939 |

OTHER REFERENCES

Instruments, vol. 20, November 1947, pages 978, 980. Publ. by Instruments Publ. Co., 921 Ridge Avenue, Pittsburgh, Pa.